(12) United States Patent
Cendak

(10) Patent No.: US 7,320,635 B2
(45) Date of Patent: Jan. 22, 2008

(54) DEVICE FOR SHARPENING CHAIN SAW TEETH

(76) Inventor: Drago Cendak, Alietova 10, Izola (SI) 6310

( * ) Notice: Subject to any disclaimer, the term of this patent is extended or adjusted under 35 U.S.C. 154(b) by 0 days.

(21) Appl. No.: 10/581,467

(22) PCT Filed: Nov. 25, 2004

(86) PCT No.: PCT/SI2004/000039

§ 371 (c)(1),
(2), (4) Date: Jun. 1, 2006

(87) PCT Pub. No.: WO2005/053889

PCT Pub. Date: Jun. 16, 2005

(65) Prior Publication Data

US 2007/0167121 A1    Jul. 19, 2007

(30) Foreign Application Priority Data

Dec. 1, 2003    (SI)    ............................. P-200300290

(51) Int. Cl.
*B24B 19/00*    (2006.01)
*B24B 5/00*    (2006.01)
*B24B 37/00*    (2006.01)
*B23D 63/12*    (2006.01)

(52) U.S. Cl. ...................... 451/419; 451/439; 451/143; 76/40

(58) Field of Classification Search ................ 451/419, 451/143, 439; 76/40, 80.5, 25 A
See application file for complete search history.

(56) References Cited

U.S. PATENT DOCUMENTS

| 3,592,085 | A | * | 7/1971 | Arneson | ...................... 76/80.5 |
| 3,890,857 | A | * | 6/1975 | Simington | ................... 76/80.5 |
| 4,104,793 | A | * | 8/1978 | Simington | .................... 30/139 |
| 4,762,027 | A | * | 8/1988 | Fagiolini et al. | ............. 76/80.5 |

* cited by examiner

*Primary Examiner*—Alvin J. Grant
(74) *Attorney, Agent, or Firm*—Beem Patent Law Firm

(57) ABSTRACT

A device for sharpening chain saw teeth, in particular a chain saw which is portable and applicable in the field, and where the chain is not to be taken off the chain saw blade when sharpened enables swinging of a grinding wheel (16) transversally to each tooth (8) of a chain (7) resulting in straight cutting faces of each tooth (8). The grinding wheel (16) of the relatively small diameter is rotated by an actuator (15) of the suitably small power and high number of the revolutions resulting in high cutting speed. Said actuator (15) can be either an electric motor, supplied with electricity from electric mains or a battery, a pneumatic motor or a hydraulic motor.

9 Claims, 3 Drawing Sheets

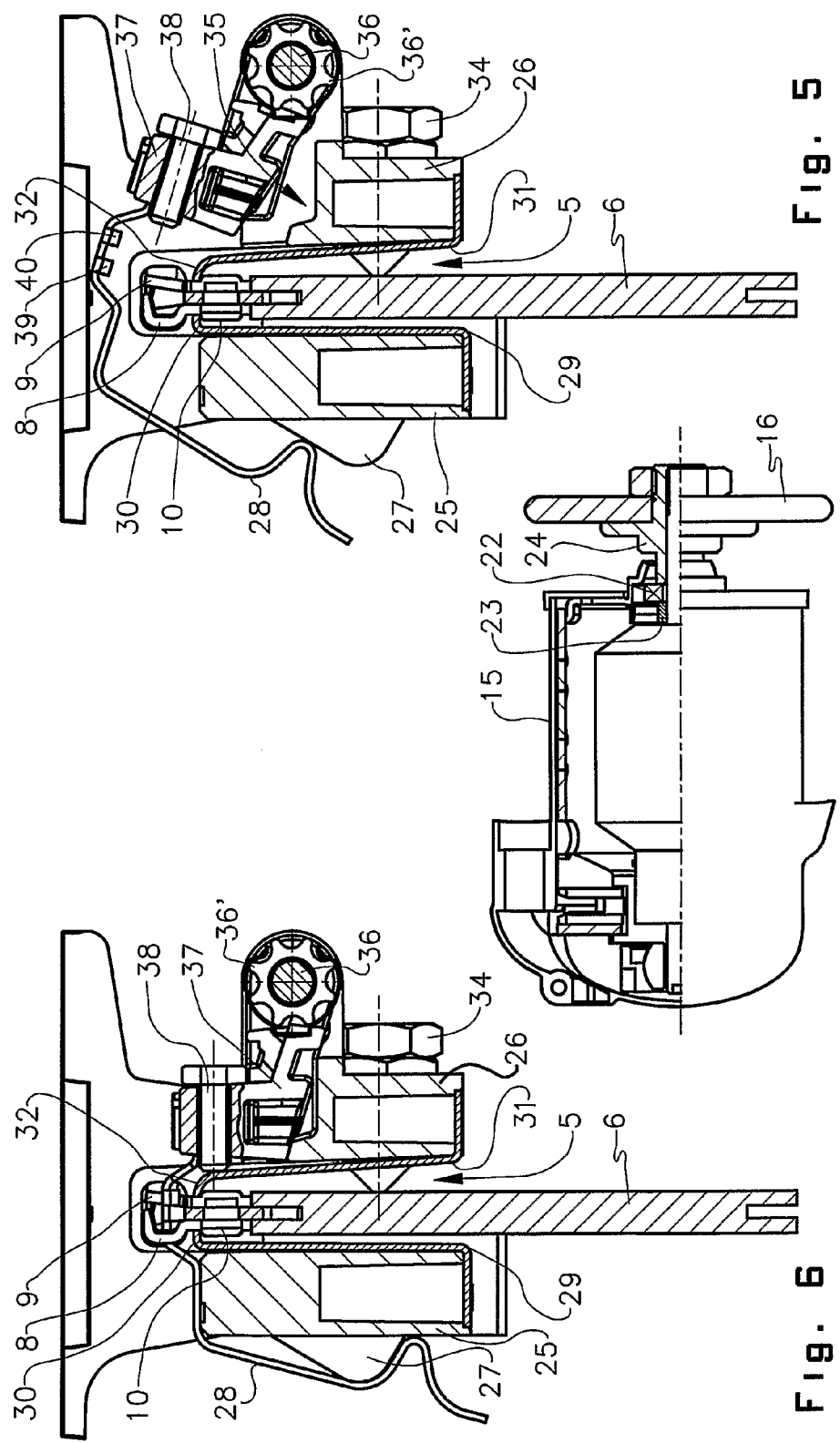

DEVICE FOR SHARPENING CHAIN SAW TEETH

FIELD OF THE INVENTION

The present invention refers to a device for sharpening chain saw teeth, in particular a chain saw which is portable and applicable in the field, and where the chain is not to be taken off the chain saw blade when being sharpened.

BACKGROUND AND DISCUSSION OF PRIOR ART

Several known solutions exist for sharpening chain saw teeth, all of them being limited either to the use in the service and maintenance facilities, or to different embodiments of hand files. For instance, a solution is disclosed in the U.S. Pat. No. 3,172,306 enabling guidance of the file in the set direction providing an accurate geometry of cutting surfaces of each tooth. The drawback of the said solution is the slowness of the sharpening and the inability of ensuring the repeatability of sharpening even with the very next tooth. The device is unstable when used and unsuitable for use in an arbitrary location. Another solution is known from the U.S. Pat. No. 4,762,027 where a grinding wheel travels during sharpening over an arch determined by a bearing located transversally to the chain plane. Such an arrangement results in the convexity of the cutting edge of a tooth representing a situation which is the opposite to what is wanted. Still another solution disclosed in, the U.S. Pat. No. 4,319,502 comprises a grinding wheel swinging in a vertical plane, however, this solution did not remedy the problem of the convexity of the surface to be sharpened. In addition, the said device is too big and too heavy for field work, and is also unfavourable with regard to the power consumption.

SUMMARY OF THE INVENTION

It is the object of the present invention to create a device for sharpening chain saw teeth which is simple to use, easily portable, and which ensures, regardless of the location of use, high quality and repeatable precision of the sharpening.

According to the invention the object set forth is solved by that a sharpening device enables swinging of a grinding wheel transversally to a single tooth of a chain and at an adjustable angle of attack, ensuring therewith levelled cutting surfaces and an appropriate cutting angle of each tooth. The grinding wheel of a relatively small diameter is powered by an actuator having a relatively low power and high rotational speed, resulting in a high cutting speed. Said actuator can be either an electric motor, supplied with electricity from an electric mains or a battery, a pneumatic motor or a hydraulic motor.

The device according to the invention comprises a spatial curved carrier fixed by means of a fastening means to the upper end of an arm originating in a body, so that said carrier can be optionally shifted on the circular arc along said fastening means. Said body is provided on the lower side and over the entire length thereof with a groove which penetrates the body in the area between said arms and is connected to a gap between said arms. The free end of the carrier is connected by means of a mounting to a swivel arm which lies essentially in a plane being predominantly parallel to the plane of the carrier. The actuator with the grinding wheel is associated with the free end of the swivel arm.

The first, left body half is formed with a click bulge on the outside i.e. on the side facing away from a chain blade, said click bulge may be of a form for engaging a click spring guard. An adapter is associated with the inside of the left body half, said adapter reaching the chain area with an inwardly bent flange provided at the free end thereof. A flexible adapter is associated with the inside of the right body half said adapter reaching the chain area with an inwardly bent flange provided at the free end thereof. Said flanges of each adapter may set on from above a pair of pins of each chain link. Furthermore, the left half comprises a distance bolt with which the adapter is moved in either direction. Two distance screws extend through the right body half and through the flexible adapter, said distance screws being intended for fixing the device to the saw blade. The right body half is formed with a recess in the upper part thereof and in the area between the arms of the body, a correspondingly formed pressure member, which can be swing about an adjusting screw, rests in said recess. Said pressure member is intended to compensate potential clearance of the adjusting screw. An adjusting nut mates with said adjusting screw determining the sharpening depth in the horizontal direction i.e. in the direction of the chain of the saw.

In order to facilitate as accurate sharpening of the teeth as possible the mounting of the spatial curved carrier and the swivel arm must be formed without any superfluous friction and clearance. This is achieved by a pair of bearings being held on a constant mutual distance by means of a spacer which is indirectly in contact with the inner ring of each bearing, whereas the outer ring of each bearing is held on one side with the head of a bolt carrying said bearings and on the other side with a nut.

An additional measurement for increasing the accuracy of sharpening the teeth of the chain saw provides for to eliminate the axial clearance of the rotor shaft of the actuator. This is achieved by having the first rotor bearing located on the side of the grinding wheel, fixed by the outer ring of said bearing in the stator of the actuator, whereas the inner ring of said bearing is held on one side with a sleeve extending up to the rotor of the actuator and on the other side with a shoulder for receiving the grinding wheel.

BRIEF DESCRIPTION OF THE DRAWINGS

The present invention will become more fully understood from the detailed description given hereinafter and the accompanying drawings, wherein FIG. 5 shows the device according to the invention in a partial cross-section, FIG. 6 shows the device of FIG. 5 with a fixed chain saw, and FIG. 7 shows an actuator in a partial longitudinal section.

DESCRIPTION OF THE INVENTION

Figure 1:
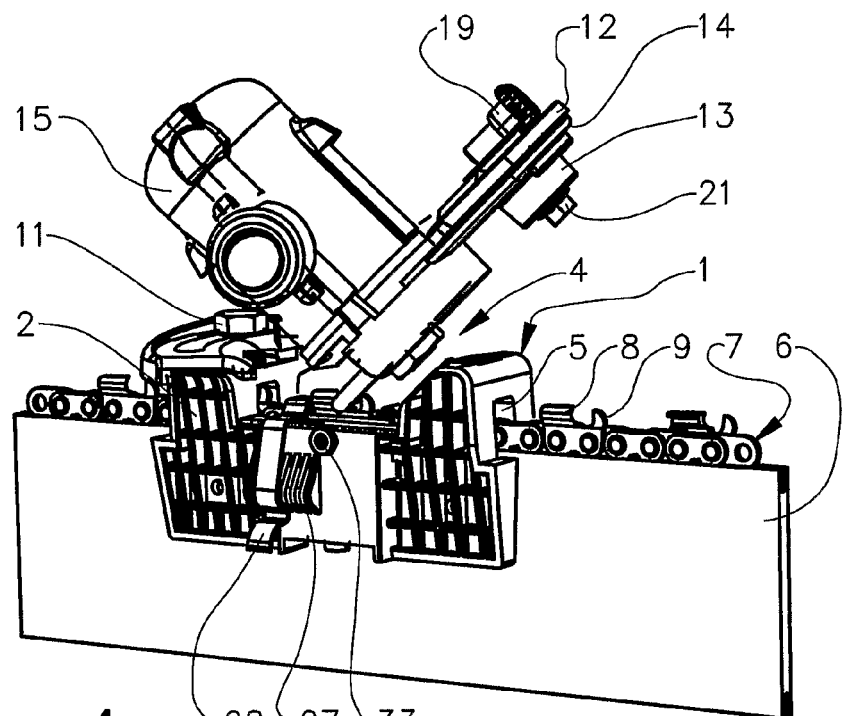
FIG. 1 shows a perspective view of a device according to the invention.
Figure 2:
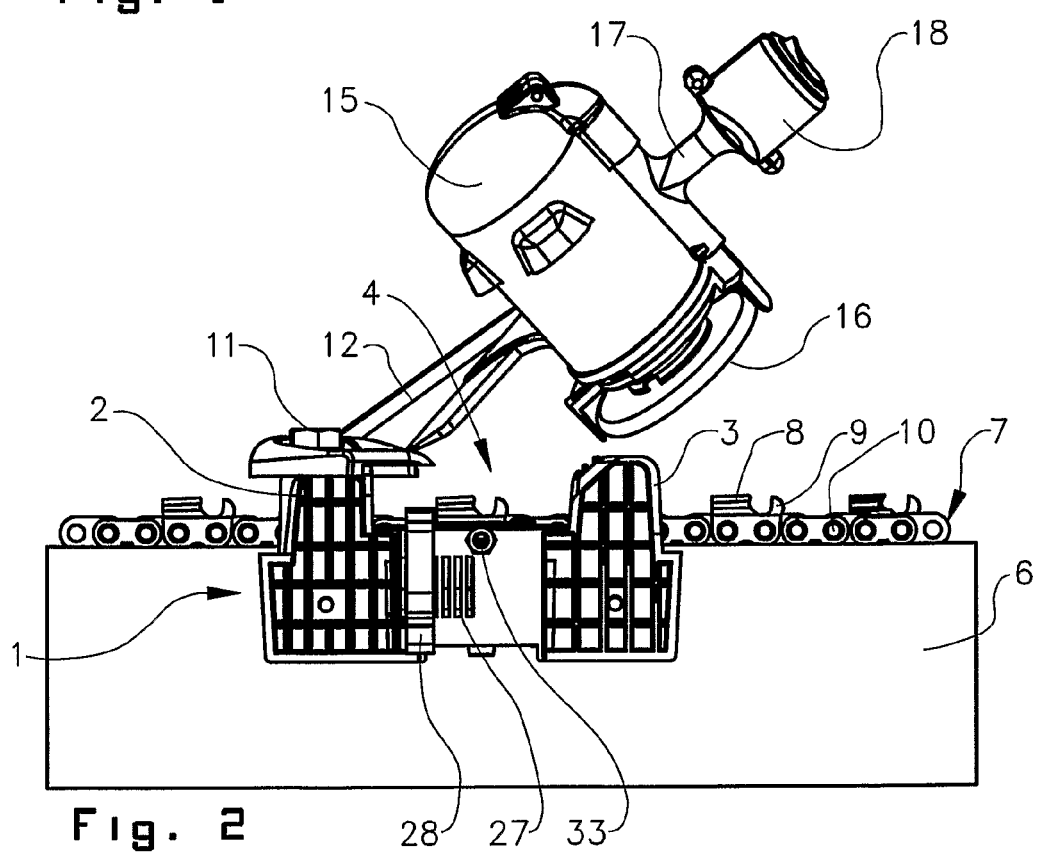
FIG. 2 shows a side view of the device of FIG. 1 with a grinding wheel moved further away.
Figure 3:
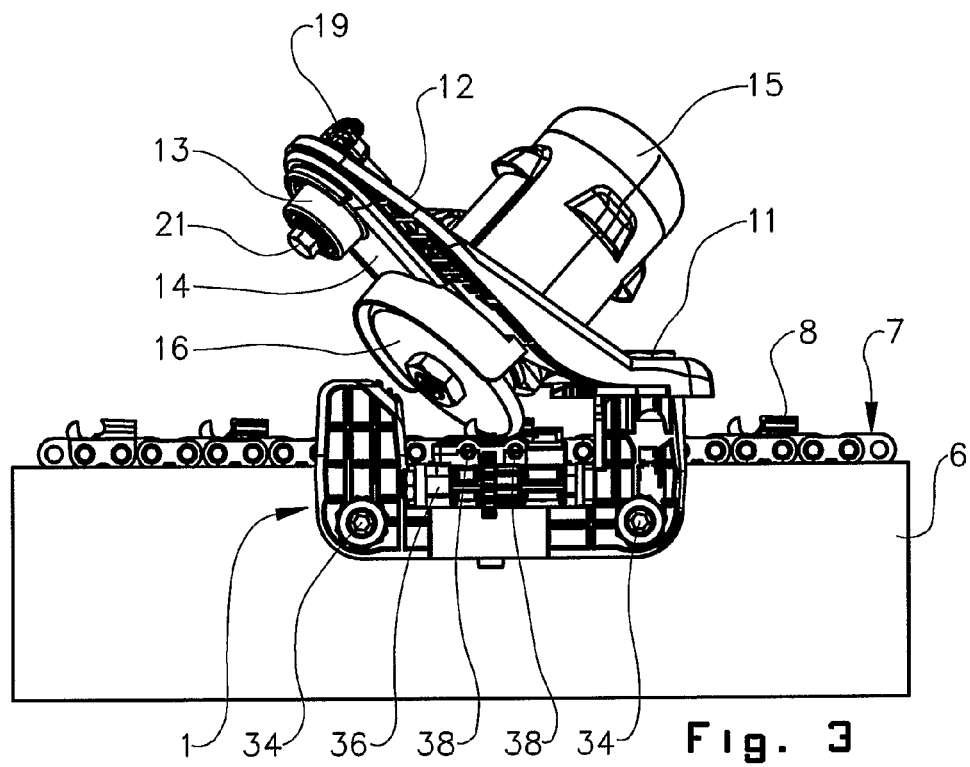
FIG. 3 shows a side view of the device of FIG. 2 with a grinding wheel moved closer.
Figure 4:
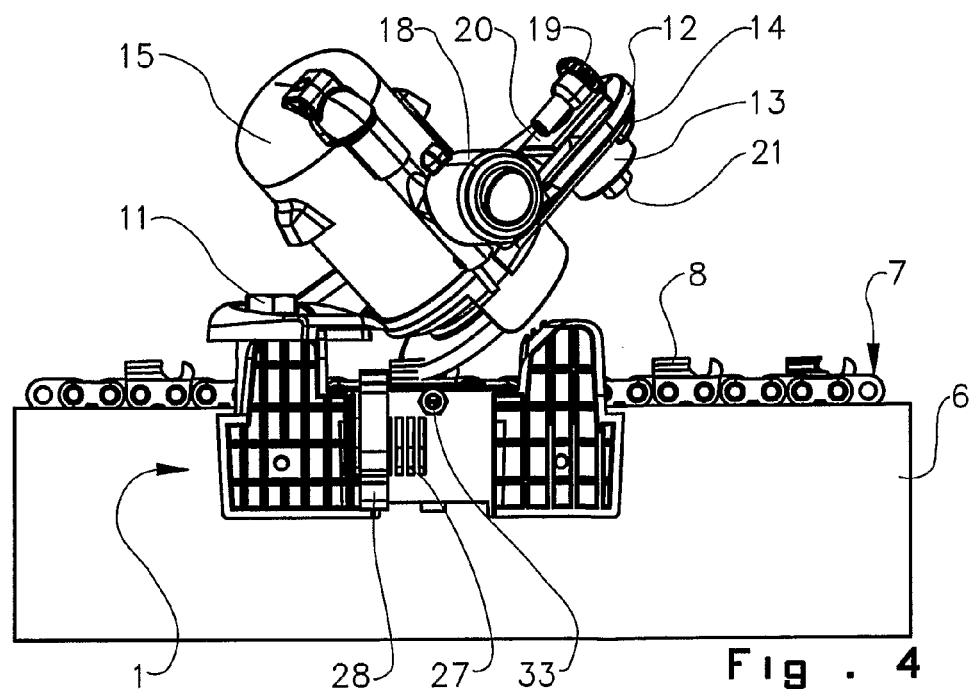
FIG. 4 shows another side view of the device of FIG. 2 with a grinding wheel moved closer.

A device according to the invention comprises a body 1 from the first side thereof, in a given case from the upper side, originate two arms 2, 3 formed on each longitudinal end of said body, a gap 4 being arranged between said arms. The body 1 is formed with a groove 5 from the second side thereof, in a given case from the bottom side, so that the body 1 in a cross direction resembles a shape of the upside down character U. Said groove 5 penetrates the body 1 in the area between both arms 2, 3 so that said groove is connected to the gap 4 and is intended to receive a saw blade 6 to which a chain 7 is drawn up, said chain consists of chain links comprising teeth 8 and guide members 9 being integral with said teeth, each said link being associated with the chain 7 via a pair of pins 10.

A spatially curved carrier 12 is fixed to the free end i.e. to the upper end of the afore mentioned arms by means of a fastening means 11 so that it can be optionally shifted along an arc and the fastening means 11 when the latter is loosened. The tilting of the carrier 12 relative to the imaginary plane of the saw teeth 8 in the area of the sharpening preferably equals to approximately 45°. The free end of the carrier 12 which is located at the starting position of the device operation approximately in the mid area above the chain 7, is connected to a swivel arm 14 by means of a mounting 13, said arm being essentially arranged in a plane being predominantly parallel to the plane of the carrier 12. An actuator 15 with a grinding wheel 16 is attached to the free end of the swivel arm 14. Said actuator 15 can be either an electric motor, supplied with electricity from electric mains or a battery, and a pneumatic motor or a hydraulic motor. In order to achieve sharpening accuracy, the mounting 13 of the spatially curved carrier 12 and the swivel arm 14 must be formed with the smallest clearance possible. Therefore, the mounting 13 of the swivel arm 14 in the spatially curved carrier 12 consists of two bearings being held in a constant mutual distance by means of a spacer which is in direct contact with the inner ring of each bearing. On one side, the outer ring of each bearing is held by the head of a bolt carrying both bearings, and on the other side it is held by a nut. The said spacer holds the bearings in such a distance that the swinging movement of the swivel arm 14 is always secured without unnecessary wear and clearance. An adjusting arm 17 with an on-off switch 18 is located on said actuator 15, and said switch is preferably of such a form that the actuator 15 is turned off when the switch 18 is released. Using a set means 19, the mounting 13 and the swivel arm 14 can be moved in a guide 20 nearer and further, respectively, in the direction towards and away from the axis of the grinding wheel 16, respectively and the grinding pitch in a vertical direction is set therewith. The chosen position of the swivel arm 14 relative to the spatially curved carrier 12 can be positionally secured by means of a fastening means 21.

The sharpening accuracy is additionally increased by means of mounting of the rotor shaft of the actuator 15 in a way that the axial clearance of said shaft is practically entirely eliminated. This is achieved by that the first rotor bearing 22, facing the grinding wheel 16, is fixed by the outer ring thereof in a stator of the actuator 15, whereas the inner ring thereof is held on one side with a sleeve 23 extending to the rotor of the actuator 15 and on the other side, by a shoulder 24 which receives the grinding wheel. Said first bearing 22 is preferably selected as a roller bearing.

The device according to the invention is further described with reference to the FIGS. 5 and 6 showing cross sectional views of a part of said device. As already mentioned above, the said body 1 resembles, in the transverse direction the shape of the letter U turned upside down comprising the first, left half 25, the second, right half 26 and the groove 5 extending therebetween to receive the saw blade 6 with the chain 7. The first, left half 25 of the body 1 is provided on its outer side, i.e. the side facing away from the saw blade 6, with a click bulge 27 intended for cooperation with a click spring guard 28. An adapter 29 is attached to the inner side of the left half 25 of the body 1 extending with a flange 30 into the area of the chain 7, said flange 30 being formed on the free end of said adapter and turned inwards. Similarly, a flexible adapter 31 is attached to the inner side of the right half 26 of the body 1 extending with a flange 32 into the area of the chain 7, said flange 32 being formed on the free end of said adapter and turned inwards. Said flanges 30, 32 of the respective adapter 29, 31 sit from the above onto the pair of pins 10 of the respective link of the chain 7 when the device according to the invention is set correctly. The factory setting of the device according to the invention with regard to the thickness of the saw blade 6 is achieved by means of a distance bolt 33 with which the adapter 29 is moved closer to or away from. Through the right half 26 of the body 1 and through the flexible adapter 31 extend two distance bolts 34 which are tightened up when the device according to the invention is mounted onto the saw blade 6 so as to press against said saw blade with their respective ends, whereby the sharpening device is stabilized on said saw blade. Said distance bolts 34 are connected in a limited way to the right half 26 of the body 1 by means of a nut and a lock nut so that they can always be tightened up with varying force, yet the pressure against the saw blade 6 remains the same in every instance.

The right half 26 of the body 1 is formed with a recess 35 in the upper part thereof and in the area between the arms 2, 3 of the body 1, a suitably formed pressure member 37 cooperates with the said recess when the sharpening device is mounted onto the saw blade 6, said pressure member 37 being pivoted about an adjusting screw 36, whereby in the closed position the pressure member 37 compensates any potential clearance of the adjusting screw 36. The grinding depth in a horizontal direction can be set by moving the pressure member 37 by means of an adjusting nut 36' arranged on the adjusting screw 36. In order for the pressure member 37 to be precisely set to the thickness of the saw blade 6 it comprises a pair of distance bolts 38 arranged substantially perpendicular to the saw blade 6, and when the sharpening device is ready to operate, said bolts press with the ends thereof against the flexible adapter 31 which is seated with the flange 32 thereof from the above onto two pins 10 of the chain 7. The aforementioned click spring guard 28 is attached to the said pressure member 37 said guard comprising a pair of shoulders 39, 40 arranged in a manner that one of them arrests the tooth 8 being sharpened when the guard 28 is closed i.e. when said guard cooperates with the click bulge 27. The first of said shoulders 39, 40 is intended for arresting the right tooth and the second one for arresting the left tooth of the chain 7. Said adjusting screw 36 is intended for setting the sharpening depth.

The sharpening device according to the invention is mounted onto the saw blade 6 and fixed by tightening the distance bolts 34. The flange 30 of the adapter 29 of the left half 25 of the body 1 must sit from above onto two pins 10 of the chain 7. Afterwards, the pressure member 37 is swung in order to sit into the recess 35 and now also the flange 32 of the flexible adapter 31 of the right half 26 of the body 1 is seated from the above onto two pins 10 of the chain. The chain 7 is manually pulled into the sharpening area so that the tooth 8 to be sharpened is centred between the flanges 30, 32 and below the grinding wheel 16. Now, the click spring guard 28 is swung over the chain 7 so that it meshes with the click bulge 27, where one of the shoulders 39, 40 arrests the tooth 8 to be sharpened. The actuator 15 is switched on and swung about the mounting 13 so that the respective tooth 8 is sharpened. When the first saw tooth 8 is sharpened the guard 28 is removed so that it cooperates no longer with the bulge 27, and the pressure member 37 is partially swung out releasing the chain 7 which is again manually forwarded by the distance of one tooth 8 arranged on the same side. The pressure member 37 is swung back towards the blade 6 and the guard 28 is locked again onto the bulge 27, and the sharpening of the tooth 8 is repeated.

Due to the form of the saw teeth 8 the height thereof decreases with the number of sharpenings resulting in a smaller cutting depth. In order to maintain the proper cutting depth, the guide member 9 located in front of each tooth 8 must be occasionally lowered. The fastest way to achieve this is to insert a wider grinding wheel with the slanted grinding face enabling grinding down to the new height in the smallest number of steps possible.

The invention claimed is:

1. A device for sharpening the teeth of a chain of a chain saw blade, the device being portable and usable the in field, and where the chain is not to be taken off the chain saw blade while being sharpened; wherein a spatial curved carrier (12) is fixed at one end, by means of a fastening means (11), to an upper end of one of two arms (2, 3) originating in a body (1), so that said carrier (12) can be optionally shifted on a circular arch along said fastening means (11), said body is provided over the entire length thereof with a groove (5) which penetrates the body (1) in an area between said arms (2, 3) and is connected to a gap (4), a free end of the carrier (12) is connected by a mounting (13) to a swivel arm (14) which lies essentially in a plane being predominantly parallel to the plane of the carrier (12), an actuator (15) with a grinding wheel (16) is associated with the free end of the swivel arm (14), wherein a left half (25) of the body (1) is formed with a click bulge (27) on the outside thereof, which is, on a side facing away from a chain blade (6), said click bulge intended for cooperation with a click spring guard (28), an adapter (29) is associated with an inside of the left half (25) of the body (1), said adapter reaching a chain (7) area with an inwardly bent flange (30) provided at a free end thereof, wherein a flexible adapter (31) is associated with the inside of the right half (26) of the body (1), said flexible adapter (31) reaching the chain (7) area with an inwardly bent flange (32) provided at the free end thereof; wherein the left half (25) comprises a distance bolt (33) with which the adapter (29) is moved towards or away from the chain blade, and that a first pair of distance bolts (34) extend through the right half (26) and through the flexible adapter (3 I), the right half (26) of the body (1) is formed with a recess (35) in an upper part thereof and in an area between the arms (2,3) of the body (1), a pressure member (37) which can be swung about an adjusting screw (36) rests in said recess, an adjusting nut (36') mates with said adjusting screw (36) and determines a sharpening depth in a horizontal direction, wherein the pressure member (37) comprises a pair of distance bolts (38) arranged substantially perpendicular to the chain blade (6), when the sharpening device is ready to operate, a second pair of distance bolts (38) pressed against the flexible adapter (31) with ends thereof; and wherein the click spring guard (28) is located on the pressure member (37) and comprising a pair of shoulders (39, 40) arranged in a way that one of the shoulders holds a tooth (8) to be sharpened when the click spring guard (28) cooperates with the click bulge (27).

2. A device according to claim 1, wherein the respective flanges (30,32) of the adapter and flexible adapters (29, 31) engage a pair of pins (10) of each chain (7) link.

3. A device according to claim 1, wherein the adjusting nut (36') arranged on said adjusting screw (36) is provided for setting the sharpening depth.

4. A device according to claim 1, wherein the first pair of distance bolts (34) are tightened when mounting the device onto the saw blade so that the first pair of distant bolts press against the saw blade with the ends thereof and stabilize the sharpening device on the saw blade.

5. A device according to claim 1, wherein the mounting (13) of the spatially curved carrier (12) and the swivel arm (14) are formed by a pair of bearings being held at a constant mutual distance by means of a spacer which is indirectly in contact with an inner ring of each bearing whereas an outer ring of each bearing is held on one side with the head of a bolt carrying said bearings and on the other side with a nut.

6. A device according to claim 1, wherein a mounting of a rotor shaft of the actuator (15) is formed in a manner that a first rotor bearing (22) facing the grinding wheel (16) is fixed with an outer ring in a stator of the actuator (15) whereas an inner ring is held, on one hand, with a sleeve (23) extending to the rotor of the actuator (15), and with a shoulder (24) for receiving the grinding wheel (16), on the other hand.

7. A device according to claim 6, wherein said first bearing (22) is preferably a roller bearing.

8. A device according to claim 1, wherein a slant of the spatially curved carrier (12) with regard to an imaginary plane of the teeth (8) in the sharpening area comprises an angle of about 45°.

9. A device according to claim 1, wherein the actuator (15) is either an electric, a pneumatic or a hydraulic motor.

* * * * *